(12) United States Patent
Sakurada et al.

(10) Patent No.: US 10,427,338 B2
(45) Date of Patent: Oct. 1, 2019

(54) HEATING CYLINDER COVER AND HEATING CYLINDER DEVICE OF INJECTION MOLDING MACHINE

(71) Applicant: NISSEI PLASTIC INDUSTRIAL CO., LTD., Nagano-ken (JP)

(72) Inventors: Yuichi Sakurada, Nagano-ken (JP); Yoshihiko Takahashi, Nagano-ken (JP); Takahiro Kouda, Nagano-ken (JP)

(73) Assignee: NISSEI PLASTIC INDUSTRIAL CO., LTD., Nagano-Ken (JP)

(*) Notice: Subject to any disclaimer, the term of this patent is extended or adjusted under 35 U.S.C. 154(b) by 129 days.

(21) Appl. No.: 15/644,338

(22) Filed: Jul. 7, 2017

(65) Prior Publication Data

US 2018/0009140 A1    Jan. 11, 2018

(30) Foreign Application Priority Data

Jul. 8, 2016 (JP) .................. 2016-135678

(51) Int. Cl.
*B29C 45/03* (2006.01)
*B29C 45/16* (2006.01)
*B29C 45/20* (2006.01)
*B29C 45/72* (2006.01)
*B29C 45/74* (2006.01)
*B29L 31/18* (2006.01)

(52) U.S. Cl.
CPC .............. *B29C 45/03* (2013.01); *B29C 45/16* (2013.01); *B29C 45/20* (2013.01); *B29C 45/72* (2013.01); *B29C 45/74* (2013.01); *B29L 2031/18* (2013.01)

(58) Field of Classification Search
CPC ....................................................... B29C 45/03
USPC ............................................................ 428/68
See application file for complete search history.

(56) References Cited

U.S. PATENT DOCUMENTS

2016/0298873 A1* 10/2016 Chan .................. F22B 1/28

FOREIGN PATENT DOCUMENTS

| JP | 2004-291545 A | 10/2004 |
|---|---|---|
| JP | 2009-172957 A | 8/2009 |
| JP | 2010-83090 A | 4/2010 |
| JP | 2013-226816 A | 11/2013 |

* cited by examiner

*Primary Examiner* — Brent T O'Hern
(74) *Attorney, Agent, or Firm* — Birch, Stewart, Kolasch & Birch, LLP

(57) ABSTRACT

A heating cylinder cover for covering a heating cylinder includes a temperature control mechanism in which at least a plurality of heating units are provided on an outer circumferential surface of a heating cylinder body along an axial direction. The heating cylinder cover includes a heat-retaining cover part that is integrally provided with a cover body part and a plurality of partition parts. The cover body part is attached to the heating cylinder thereby forming a predetermined covered space between the cover body part and the temperature control mechanism and covers at least an upper half part of the heating cylinder. The partition parts project from an inner surface of this cover body part toward the temperature control mechanism and divides the covered space into a plurality of closed spaces.

15 Claims, 7 Drawing Sheets

HEATING CYLINDER COVER AND HEATING CYLINDER DEVICE OF INJECTION MOLDING MACHINE

TECHNICAL FIELD

This invention relates to a heating cylinder cover and a heating cylinder device of an injection molding machine that are suited to be used in a heating cylinder provided with at least a plurality of heating units on the outer circumferential surface of a heating cylinder body along an axial direction.

BACKGROUND ART

Generally, a heating cylinder composing an injection device of an injection molding machine is provided with a plurality of heating units on the outer circumferential surface thereof along an axial direction in order to keep resin material supplied to inside the heating cylinder in a molten state, thereby the resin material is heated to a high temperature condition of around 300 [° C.] and also temperature control is performed with respect to each heating area so that the optimal temperature distribution in the axial direction is obtained. Accordingly, a heating cylinder cover covering the circumference of the heating cylinder is provided for the purpose of ensuring the heat-retaining property to enhance the energy saving and preventing an operator from coming in contact with the heating cylinder.

Conventionally, as this kind of heating cylinder covers, a heating cylinder heat retaining device disclosed in JP-No. 2004-291545, a heating cylinder protective cover disclosed in JP-No. 2013-226816, a heat retaining method disclosed in JP-No. 2010-083090, and a temperature control mechanism disclosed in JP-No. 2009-172957 are known.

The heating cylinder heat retaining device in patent literature 1 is intended to reduce the power consumption of a plastic molding machine and enhance the heat retaining effect; specifically, the surface of a heat retaining cover having a double structure using stainless material is finished to a mirror surface, thereby heat rays (electromagnetic waves) radiated from the surface of a heating cylinder are reflected toward the heating cylinder, and the heat rays (the electromagnetic waves) radiated to the opposite side of the heating cylinder by an inner reflector are reflected to the side of the heating cylinder by an outer reflector, and also, an air space doubles as a heat retaining material, which keeps the efficient heat retaining state.

The heating cylinder protective cover disclosed in patent literature 2 is intended to increase the ability of heat dissipation from the surface of the cover to the outside air, thereby keeping the surface temperature of the cover low; specifically, there are provided a resin injection mechanical section fitted with a heating cylinder with a nozzle, a fixed platen to which, out of molds that molten resin heated and melted in the heating cylinder is injected into a cavity thereof, a fixed-side mold is attached, and the heating cylinder protective cover that covers the outer circumference of the heating cylinder for heating and melting material loaded from a resin supply port, and at least part of the outer surface of the heating cylinder protective cover is coated with heat dissipating paint.

The heat retaining method disclosed in patent literature 3 is intended to mold high-quality molded products by controlling the temperature of an injection cylinder with a higher degree of accuracy than that in a case of wrapping the outer circumferential surface of an injection cylinder in a heat-insulating cover and to make the molding work more efficient by enabling a heat-retaining jacket to be easily attached to and removed from the injection cylinder; specifically, the outer circumferential surface of the injection cylinder except a nozzle touch part is entirely wrapped in the heat-retaining jacket containing heat-insulating material through a gap with a required width, thereby each site of the injection cylinder is kept at a predetermined set temperature.

The temperature control mechanism disclosed in patent literature 4 is intended to be able to easily suppress the overshoot while obtaining the energy-saving effect by using heat-insulating material; specifically, there are provided a heating cylinder that is heated by a heater to melt resin inside thereof and discharges the molten resin, a heat-insulating material that covers at least part of the circumferentially whole circumference of the heating cylinder where the heat is installed, and the temperature control mechanism that detaches at least part of the heat-insulating material from the heating cylinder according to the temperature of the heating cylinder.

SUMMARY OF INVENTION

Technical Problem

However, the above-described conventional heating cylinder covers disclosed in patent literatures 1 to 4 have the following problems.

That is, all of the heating cylinder covers are intended to ensure the heat-insulating property and enhance the heat-retaining property, thereby reducing the power consumption and enhancing the energy saving; however, to enhance the heat-retaining property means, on the other hand, not being able to decrease the temperature promptly, and therefore it is an adverse element in terms of ensuring the controllability (the responsiveness). Accordingly, like patent literatures 3 and 4, the structure in which the heat-insulating performance can sort of be adjusted has been proposed; however, it is hard to say the structure is always the optimum remedial measure, including the point that as the structure gets complicated, it involves the troublesome operation.

Furthermore, generally, by a plurality of heating units set along an axial direction of a heating cylinder, the temperature control is performed with respect to each heating area so that the optimal temperature distribution in the axial direction is obtained; however, to enhance the heat-retaining property results in trapping high-temperature air inside the heating cylinder covers, which strengthens the action of averaging the axial temperature distribution (temperature gradient). After all, in this case, it is hard to say the sufficient reduction in power consumption and saving in energy are always achieved, including the point that the power consumption is increased by the control action of trying to maintain the normal temperature distribution.

This invention is intended to provide a heating cylinder cover and a heating cylinder device of an injection molding machine that solve problems existing in the background art.

Solution to Problem

To solve the above-described problems, in composition of a heating cylinder cover that covers a heating cylinder (2) having a temperature control mechanism (3m) in which at least a plurality of heating units (3a, 3b, 3c, . . . ) are provided on an outer circumferential surface (2ms) of a heating cylinder body (2m) along an axial direction (Fs), a heating cylinder cover (1) according to this invention of an injection molding machine (M) includes a heat-retaining cover part (5) that is integrally provided with a cover body part (5m) and a plurality of partition parts (5a, 5b, 5c, . . . ); the cover body part (5m) is attached to the heating cylinder (2) thereby forming a predetermined covered space (S) between the cover body part (5m) and the temperature control mechanism (3m) and covers at least an upper half part (2u) of the heating cylinder (2), and the partition parts (5a, 5b, 5c, . . . ) project from an inner surface (5mi) of this cover body part (5m) toward the temperature control mechanism (3m) and divides the covered space (S) into a plurality of closed spaces (Sab, Scd, . . . ).

On the other hand, to solve the above-described problems, in composition of a heating cylinder device that includes the heating cylinder (2) having the temperature control mechanism (3m) in which at least a plurality of the heating units (3a, 3b, 3c, . . . ) are provided on the outer circumferential surface (2ms) of the heating cylinder body (2m) along the axial direction (Fs) and a heating cylinder cover for covering this heating cylinder (2), a heating cylinder device (H) according to this invention of the injection molding machine (M) includes the heating cylinder cover (1) having the heat-retaining cover part (5) that is integrally provided with the cover body part (5m) and a plurality of the partition parts (5a, 5b, 5c, . . . ); the cover body part (5m) is attached to the heating cylinder (2) thereby forming the predetermined covered space (S) between the cover body part (5m) and the temperature control mechanism (3m) and covers at least the upper half part (2u) of the heating cylinder (2), and the partition parts (5a, 5b, 5c, . . . ) project from the inner surface of this cover body part (5m) toward the temperature control mechanism (3m) and divides the covered space (S) into a plurality of the closed spaces (Sab, Scd, . . . ).

Advantageous Effects of Invention

The heating cylinder cover (1) and the heating cylinder device (H) of the injection molding machine (M) according to this invention that have the above configurations achieve the following prominent effects.

[1] The heating cylinder cover (1) includes the heat-retaining cover part (5) that is integrally provided with the cover body part (5m) and a plurality of the partition parts (5a, 5bc, . . . ); the cover body part (5m) is attached to the heating cylinder (2) thereby forming the predetermined covered space (S) between the cover body part (5m) and the temperature control mechanism (3m) and covers at least the upper half part (2u) of the heating cylinder (2), and the partition parts (5a, 5bc, . . . ) project from the inner surface (5mi) of this cover body part (5m) toward the temperature control mechanism (3m) and divides the covered space (S) into a plurality of the closed spaces (Sab, Scd, . . . ); therefore, it is possible to achieve the reduction in power consumption and the improvement in energy saving due to the improvement in the heat-retaining property that are the basic effects, and also, particularly, the circulation (the movement) of air by the heating units (3a, 3b, . . . ) is obstructed and insulated by the partition parts (5a, 5bc, . . . ), and therefore, the impact (the interference) of arbitrary closed spaces (Sab, Scd, . . . ) on (with) the other spaces (Sab, Scd, . . . ) is largely reduced. As a result, the responsiveness to temperature control in each of the closed spaces (Sab, Scd, . . . ) can be enhanced, and the controllability on the temperature distribution (temperature gradient) in the axial direction (Fs) can be enhanced. Furthermore, it is possible to contribute to the improvement in energy saving due to the further reduction in power consumption accordingly.

[2] According to a preferred aspect, the cover body part 5m can be configured to have either a single-layer structure using one plate member or a multi-layer structure 11 in which a plurality of plate members 11p and 11q are stacked on top of each other through a predetermined gap Sp, and the entire heat-retaining property (heat-insulating property) can be arbitrarily set; therefore, it is possible to flexibly meet various grades and performance demands.

[3] According to another preferred aspect, by configuring at least part of the distal ends of the partition parts 5a, 5bc, . . . to lie in the gaps Sg . . . generated between the heating units 3a, 3b, . . . in the axial direction Fs, the partition parts 5a, 5bc, . . . are overlapped with the heating units 3a, 3b, in the radial direction Fd, and the blockage of the closed spaces Sab, Scd, formed by the partition parts 5a, 5bc, . . . can be further enhanced; therefore, it is possible to contribute to the further improvement in the control responsiveness and the controllability and also possible to contribute to the improvement in the ease of attachment and the attachment strength.

[4] According to still another preferred aspect, by setting the partition parts 5a, 5bc, . . . (the closed spaces Sab, Scd, . . . ) in the different heating areas Zf, Zm, . . . in the heating cylinder 2, respectively, the trackability (the controllability) on the set temperature set with respect to each of the heating areas Zf, Zm, . . . can be further enhanced.

[5] According to still another preferred aspect, by providing the heating units 3a, 3b, . . . using the band heaters B . . . provided along the circumferential direction Ff of the outer circumferential surface 2ms in the temperature control mechanism 3m, the temperature control mechanism 3m can be applied to the conventional commonly-used heating units 3a, 3b, . . . as it is, and also a conventional heating cylinder cover can be used as part of components, and thus, changes and additions are almost unnecessary when it is implemented; therefore, it is possible to ensure the versatility and be implemented with ease and low cost.

[6] According to still another preferred aspect, by providing the air-cooled type cooling units 4a, 4b, . . . composed of air passageways provided between the outer circumferential surface 2ms and the band heaters B . . . in the temperature control mechanism 3m, the control responsiveness and the controllability on the cooling side can be enhanced; therefore, it is possible to further enhance the entire controllability.

[7] According to still another preferred aspect, in composition of the heating cylinder cover 1, if it is configured to be provided with the protective cover part 12 having the porosity that is provided lateral to the cover body part 5 to cover part or all of the cover body part 5m, it is possible to achieve protection for an operator from a high-temperature part; therefore, it is possible to further enhance the safety and also possible to contribute to the stabilization of the heat-retaining property and the further improvement in the heat-retaining property.

[8] According to still another preferred aspect, on the attachment of the protective cover part 12, the attachment parts 13f . . . and 13r . . . for attachment to the heating cylinder 2 side are provided on the both right and left sides thereof in the radial direction Fd of the heating cylinder 2, respectively, and, if the attachment parts 13f . . . set on, out of the both right and left sides, at least the side on which the operation screen 100 is provided are configured to have a locking structure in which no projection part projecting outward is caused, an unwanted projection part in the area where an operator works can be eliminated; therefore, it is possible to contribute to the improvement in the working property and the safety, and further the designability (the shapeability).

[9] According to still another preferred aspect, in composition of the heating cylinder cover 1, if the heat-retaining cover part 5 is configured to have a shape of covering the upper half part 2*u* of the heating cylinder 2, and the lower protective cover part 14 having the porosity and covering the lower half part 2*d* of the heating cylinder 2 is provided on at least part or all on the heat-retaining cover part 5, it is possible to achieve protection for an operator from a lower-half high-temperature site; therefore, it is possible to further enhance the safety and, particularly, the lower half part 2*d* of the heating cylinder 2 where high-temperature air is not circulated can eliminate the need for the heat-retaining function, and only the lower protective cover part 14 can answer the purpose, and therefore, it is possible to contribute to the improvement in the low cost and the ease of assembly due to the reduction of components. [10] According to still another preferred aspect, on the attachment of the lower protective cover part 14, the attachment parts 15*f* . . . and 15*r* . . . for attachment to the heating cylinder 2 side are provided on the both right and left sides thereof in the radial direction Fd of the heating cylinder 2, respectively, and at least the attachment parts 15*f*. . . on, out of the both right and left sides, the side on which the operation screen 100 is provided are configured to have a locking structure in which no projection part projecting outward is caused, an unwanted projection part in the area where an operator works can be eliminated; therefore, it is possible to contribute to the improvement in the working property and the safety, and further the designability (the shapeability).

DESCRIPTION OF EMBODIMENTS

A preferred embodiment of this invention will be described in detail below on the basis of drawings. Incidentally, the accompanying drawings are not intended to specify this invention but are intended to facilitate the understanding of this invention. The detailed description of known parts will be omitted so that the obscurity of the invention is avoided.

First, a configuration of a heating cylinder device H including a heating cylinder cover 1 according to this embodiment is described with reference to FIGS. 1 to 6.

Figure 4:
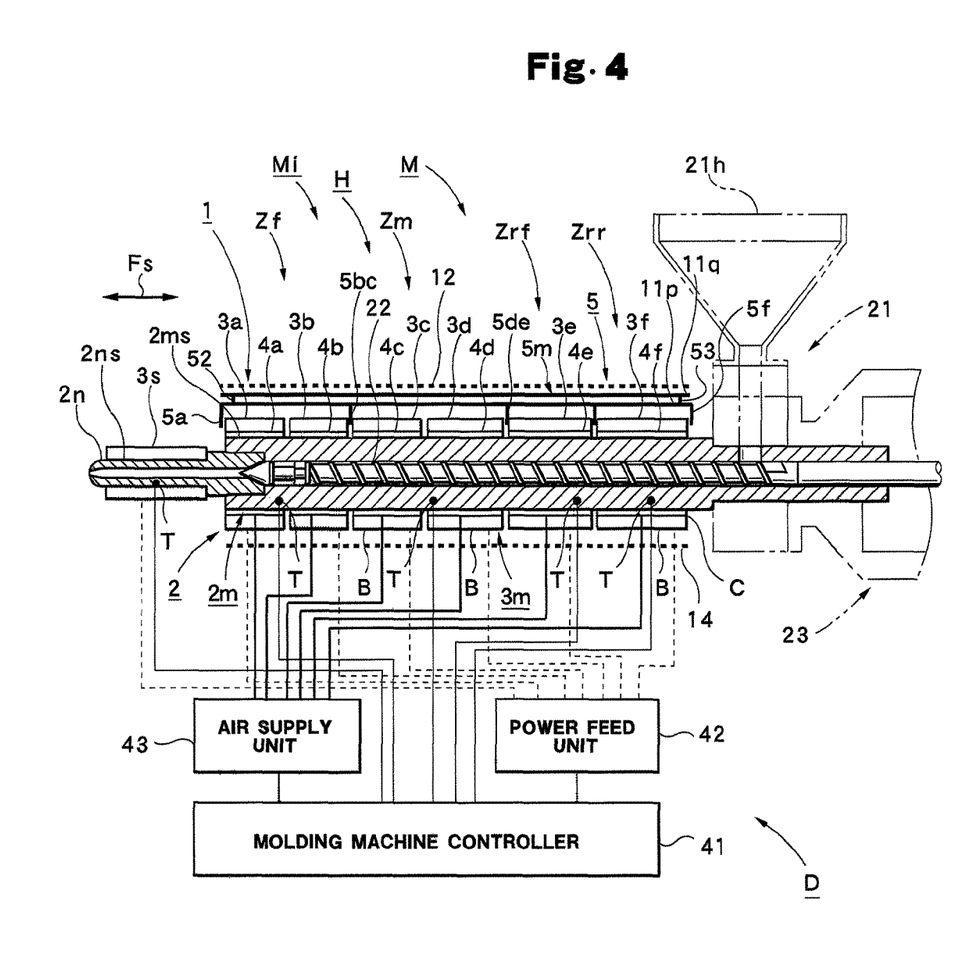
FIG. 4: An entire configuration diagram including a control system of an injection device provided with the heating cylinder device.

In FIG. 4, Mi denotes an injection device, and an injection molding machine M is composed of the injection device Mi and a mold clamping device (not shown). The heating cylinder device H according to this embodiment includes roughly the front half part of this injection device Mi.

The heating cylinder device H broadly includes a heating cylinder 2 and the heating cylinder cover 1 according to this embodiment that covers this heating cylinder 2. In this case, the heating cylinder 2 includes a heating cylinder body 2*m* and a temperature control mechanism 3*m* set on the outside of this heating cylinder body 2*m*.

The heating cylinder body 2*m* has an injection nozzle 2*n* on the front end thereof, and the back end of the heating cylinder body 2*m* is coupled to a material supply unit 21 having a hopper 21*h* for supplying a molding material into the heating cylinder body 2*m*. A screw 22 is inserted into the heating cylinder body 2*m*, the back end of the screw 22 extends posterior to the material supply unit 21 and thus the screw 22 is connected to a screw driving unit 23 which drives the screw 22 to rotate and drives the screw 22 to move forward and backward and of which the detailed description is omitted here.

Then, on an outer circumferential surface 2*ms* of the heating cylinder body 2*m* and an outer circumferential surface 2*ns* of the injection nozzle 2*n*, the temperature control mechanism 3*m* is provided. The temperature control mechanism 3*m* includes a heating unit 3*s* set on the outer circumferential surface 2*ns* of the injection nozzle 2*n*, and also a plurality of heating units 3*a*, 3*b*, 3*c*, 3*d*, 3*e*, and 3*f* and cooling units 4*a*, 4*b*, 4*c*, 4*d*, 4*e*, and 4*f* that are provided along an axial direction Fs of the outer circumferential surface 2*ms* of the heating cylinder body 2*m*. In this case, in the heating units 3*a*, 3*b*, . . . 3*f*, band heaters B . . . provided (wrapped) along the axial direction Fs of the outer circumferential surface 2*ms* are used. In general, the band heaters B . . . are conventionally used in the heating units 3*a*, 3*b*, . . . 3*f*. The optimum form of the heating cylinder device H according to this embodiment can be applied as it is to the heating units 3*a*, 3*b*, . . . 3*f* using such band heaters B . . . . Therefore, as will be described later, when it is implemented, changes and additions are almost unnecessary, including the point that a conventional heating cylinder cover can be used as part of components, and thus, it has the advantage of being able to ensure the versatility and be implemented with ease and low cost.

Figure 2:
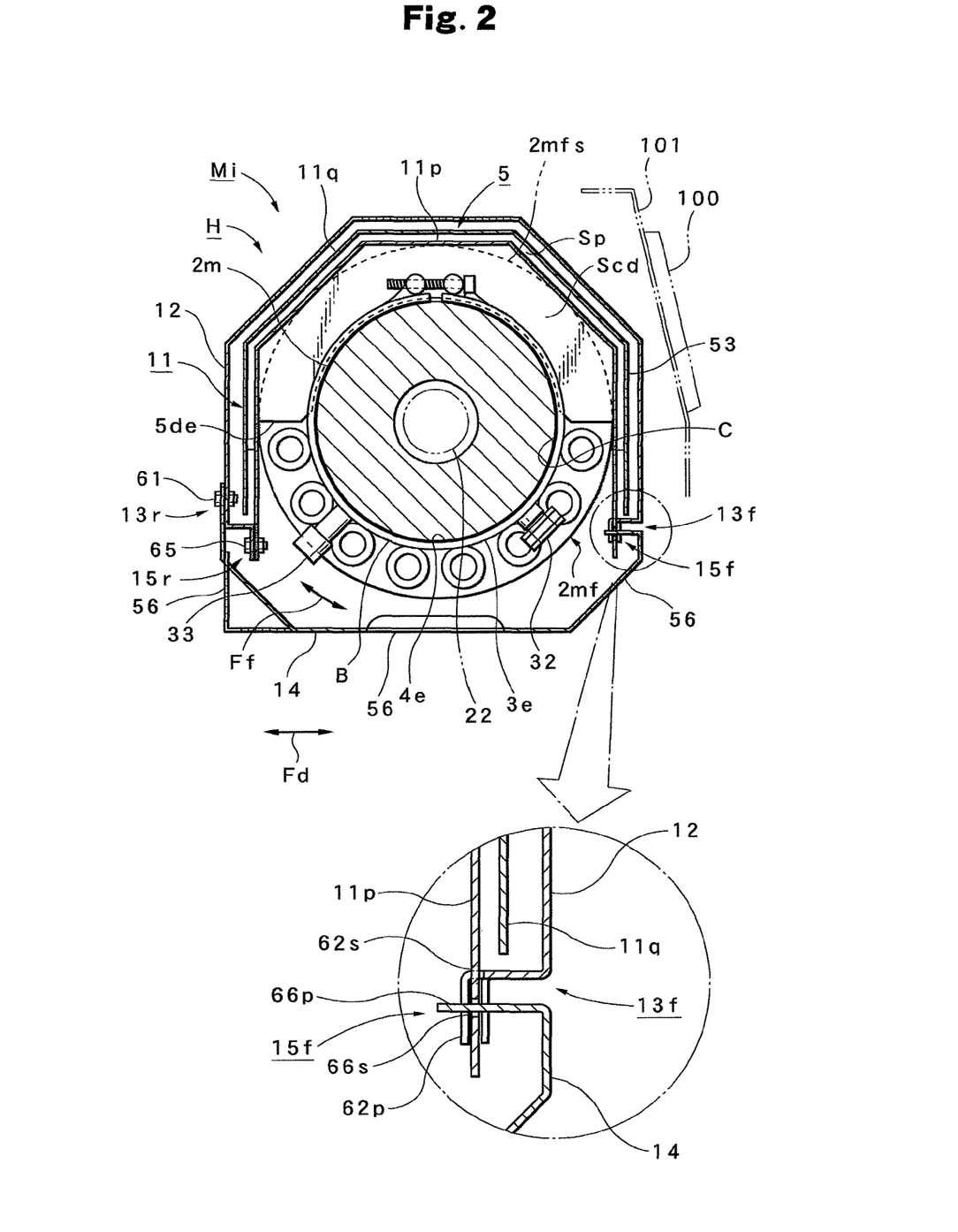
FIG. 2: A cross-sectional front view including a partially-extracted enlarged view of the heating cylinder device along a line II-II in FIG. 3.

The cooling units 4*a*, 4*b*, . . . 4*f* are configured to be an air-cooled type with air passageways (air jackets) provided between the outer circumferential surface 2*ms* and the band heaters B . . . . Although these air passageways are omitted from drawings, as shown in FIGS. 2 to 5, for example, in the case of the cooling unit 4*e* (the same goes for the other cooling units 4*a*, 4*b*, . . . ), a plate member C with a zigzag pattern or a number of patterns set in parallel formed by making a slit therein lies between the outer circumferential surface 2*ms* and the band heater B, and an air supply port 32 communicated with one end of this slit is provided. Incidentally, the other end of the slit is communicated with an air exhaust port (not shown), thereby is open to the atmosphere. By providing such cooling units 4*a*, 4*b*, . . . 4*f*, the control responsiveness and the controllability to the cooling side can be enhanced; therefore, it has the advantage of being able to further enhance the overall controllability. In FIG. 2, reference numeral 33 denotes an attachment port (an insertion port) of a temperature sensor T using a thermocouple (see FIG. 4).

In this case, the heating unit 3s heats or cools (air-cools) an injection nozzle 2n; the heating unit 3a including the cooling unit 4a and the heating unit 3b including the cooling unit 4b heat or cool (air-cool) the front part (a front heating area Zf) of the heating cylinder body 2m; the heating unit 3c including the cooling unit 4c and the heating unit 3d including the cooling unit 4d heat or cool (air-cool) the middle part (a middle heating area Zm) of the heating cylinder body 2m; the heating unit 3e including the cooling unit 4e heats or cools (air-cools) the front-side rear part (a rear-front-side heating area Zrf) of the heating cylinder body 2m; the heating unit 3f including the cooling unit 4f heats or cools (air-cools) the back-side rear part (a rear-back-side heating area Zrr) of the heating cylinder body 2m. By providing the heating units 3a . . . including the cooling units 4a . . . in the front heating area Zf, the middle heating area Zm, the rear-front-side heating area Zrf, and the rear-back-side heating area Zrr, which are different heating areas in the heating cylinder body 2m in this way, an unnecessary temperature increase in a site of occurrence of shear heat generated when resin material is sheared by the rotation of the screw 22 can be suppressed; therefore, it is possible to achieve good temperature control and contribute to the improvement in the molding quality.

Incidentally, in FIG. 4, D denotes a drive control system of the heating cylinder device H according to this embodiment. Reference numeral 41 denotes a molding machine controller composed of a computer system, which has a function of controlling the entire injection molding machine M. Reference numeral 42 denotes a power feed unit; an output unit of this power feed unit 42 is connected to the band heaters B . . . composing the heating units 3a, 3b, . . . , and a control input unit of the power feed unit 42 is connected to the molding machine controller 41. Reference numeral 43 denotes an air supply unit including an air pump and a valve; an output unit of this air supply unit 43 is connected to the air supply ports 32 of the cooling units 4a, 4b, . . . , and a control input unit of the air supply unit 43 is connected to the molding machine controller 41. The temperature sensors T . . . for detecting the temperature of sites in the heating cylinder body 2m, respectively, are connected to the molding machine controller 41. Then, a heating control signal is given from the molding machine controller 41 to the power feed unit 42, and a cooling control signal is given from the molding machine controller 41 to the air supply unit 43.

Subsequently, a configuration of the heating cylinder cover 1 according to this embodiment is specifically described with reference to FIGS. 1 to 6.

The heating cylinder cover 1 broadly includes a heat-retaining cover part 5, a protective cover part (an upper protective cover part) 12, and a lower protective cover part 14. In this case, the heat-retaining cover part 5 composes the principal part of this invention and has a shape of covering an upper half part 2u of the heating cylinder 2; the upper protective cover part 12 is set lateral to this heat-retaining cover part 5 and has a shape of covering the heat-retaining cover part 5; the lower protective cover part 14 has a shape of covering a lower half part 2d of the heating cylinder 2.

First, a configuration of the heat-retaining cover part 5 is described. The heat-retaining cover part 5 includes a cover body part 5m that is attached to the heating cylinder 2 thereby forming a predetermined covered space S between the cover body part 5m and the temperature control mechanism 3m and covers the upper half part 2u of the heating cylinder 2, and is integrally provided with a plurality of partition parts 5a, 5bc, 5de, . . . that project from an inner surface 5mi of this cover body part 5m toward the temperature control mechanism 3m and divide the covered space S into closed spaces Sab, Scd, Se, . . . .

Figure 5:
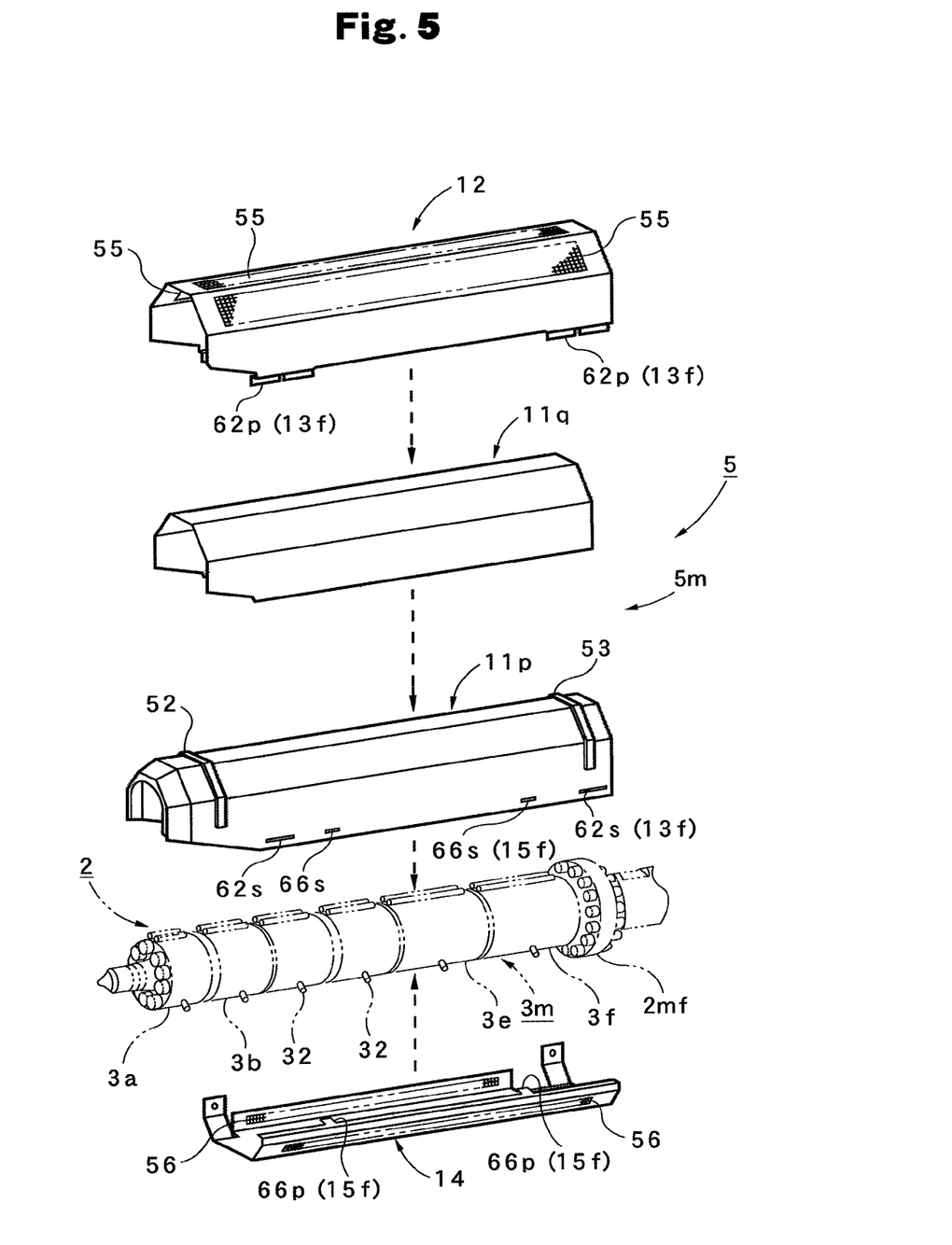
FIG. 5: An exploded perspective view of the heating cylinder cover broken down into parts included in the heating cylinder device.

As shown in FIGS. 2 and 5, the cover body part 5m is configured to have a multi-layer structure (a two-layer structure) 11 in which two plate members 11p and 11q are stacked on top of each other through a predetermined gap Sp. In this case, the one set on the inner side is the inner plate member 11p, and the other set on the outer side is the outer plate member 11q. As the plate members 11p and 11q are exposed to a high-temperature environment, formation material of the plate members 11p and 11q is preferably metallic material having the heat-resisting property, but is not limited to particular material. In the case of this example, steel material is used in the inner plate member 11p, and stainless material is used in the outer side is the outer plate member 11q. The thickness of either plate member can be arbitrarily selected in consideration of the strength, the workability, etc.

Incidentally, the cover body part 5m shown in the embodiment has the two-layer structure 11 in which the two plate members 11p and 11q are stacked on top of each other through the predetermined gap Sp; however, the structure of the cover body part 5m can be a single-layer structure using one plate member, or can be a multi-layer structure in which three or more plate members 11p . . . are stacked on top of another through the predetermined gap Sp . . . , and is not limited to a specific number of layers. The cover body part 5m can be implemented in various layer structures with different numbers of layers in this way; therefore, it can flexibly meet various grades and performance demands, including the point that the entire heat-retaining property (heat-insulating property) can be arbitrarily set.

Figure 6:
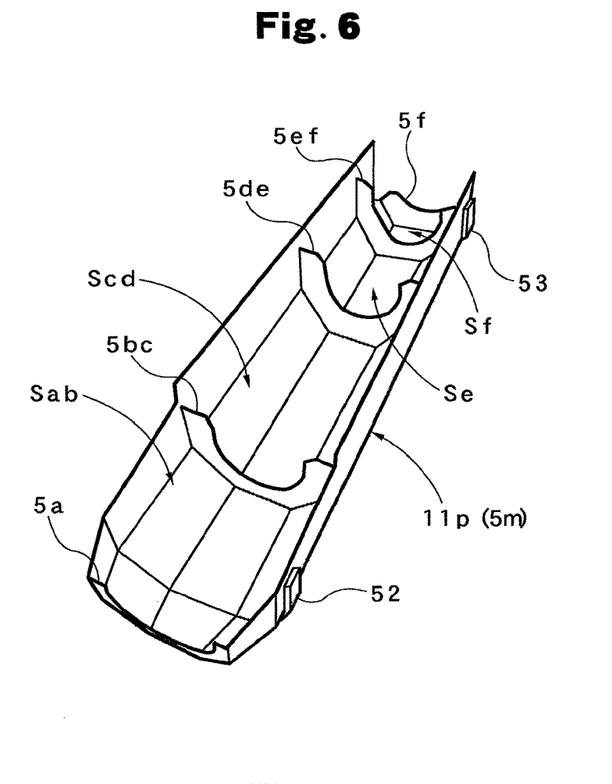
FIG. 6: An internal perspective view of a cover body part composing the heating cylinder cover of the heating cylinder device.

Furthermore, the inner plate member 11p is selected to have a length that covers from the front-side heating unit 3a to the back-side heating unit 3f in the heating cylinder 2, and, as shown in FIG. 2, its cross-sectional shape is formed into a shape of covering the upper half part 2u of the heating cylinder 2. The shape in the example is a half octagon; however, various other shapes having the same function, such as a half polygon and a semicircle, can be selected. On the other hand, on the inner surface 5mi of the inner plate member 11p that is the inner surface of the cover body part 5m, as shown in FIGS. 1 and 6, there are integrally provided a plurality of (in the example, five) partition parts 5a, 5bc, 5de, 5ef, and 5f that almost orthogonally project from this inner surface 5mi toward the temperature control mechanism 3m and divide the covered space S into a plurality of (in the example, four) closed spaces Sab, Scd, Se, and Sf.

In this case, the partition parts 5a and 5f located in the front and back ends of the inner plate member 11p double as the inner plate member 11p and can be integrally formed with the inner plate member 11p by bending front- and back-end portions of this inner plate member 11p by press working or the like, and the partition parts 5bc, 5de, and 5ef located in between the partition parts 5a and 5f can be fixed to a separately formed U-shape plate member by welding or the like. Therefore, the partition parts 5bc, 5de, and 5ef located in between the partition parts 5a and 5f are formed of the same material (with the same thickness). Accordingly, the partition parts 5a, 5bc, 5de, 5ef, and 5f are integral with the inner plate member 11p.

Figure 3:
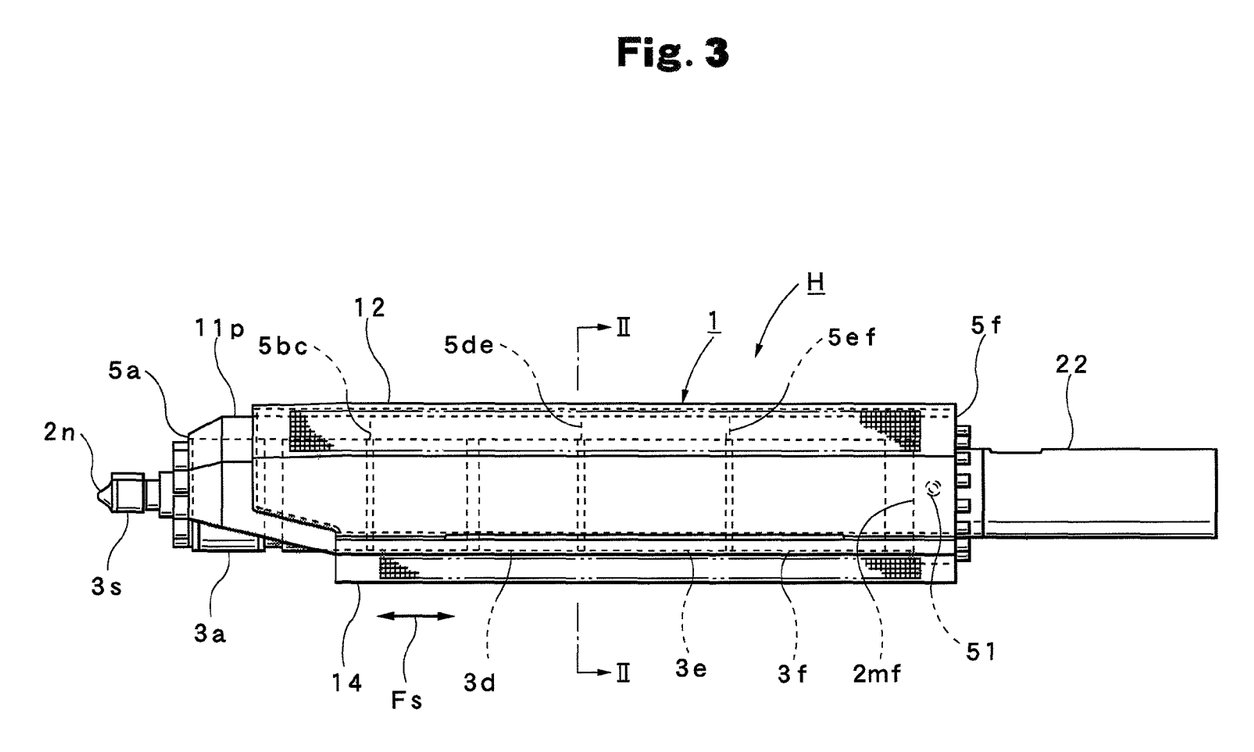
FIG. 3: An external side view showing the entire heating cylinder device.

Furthermore, this inner plate member 11p is used by being directly attached to the heating cylinder body 2m side. In this case, as shown in FIG. 1, an inner end side 5as of the front-end partition part 5a is set in direct contact with (is locked in) the outer circumferential surface 2ms of the heating cylinder body 2m located in the front side of the heating unit 3a (the cooling unit 4a), and the inner surface of the back end of the inner plate member 11p is put on an outer circumferential surface 2mfs of a flange part 2mf shown in FIG. 5, which has a larger diameter than that of this heating cylinder body 2m and is provided at the back end of the heating cylinder body 2m, and then, as shown in FIG. 3, can be fixed by fixing bolts 51 . . . . Therefore, the back-end partition part 5f is located facing the back end surface of the flange part 2mf.

Figure 1:
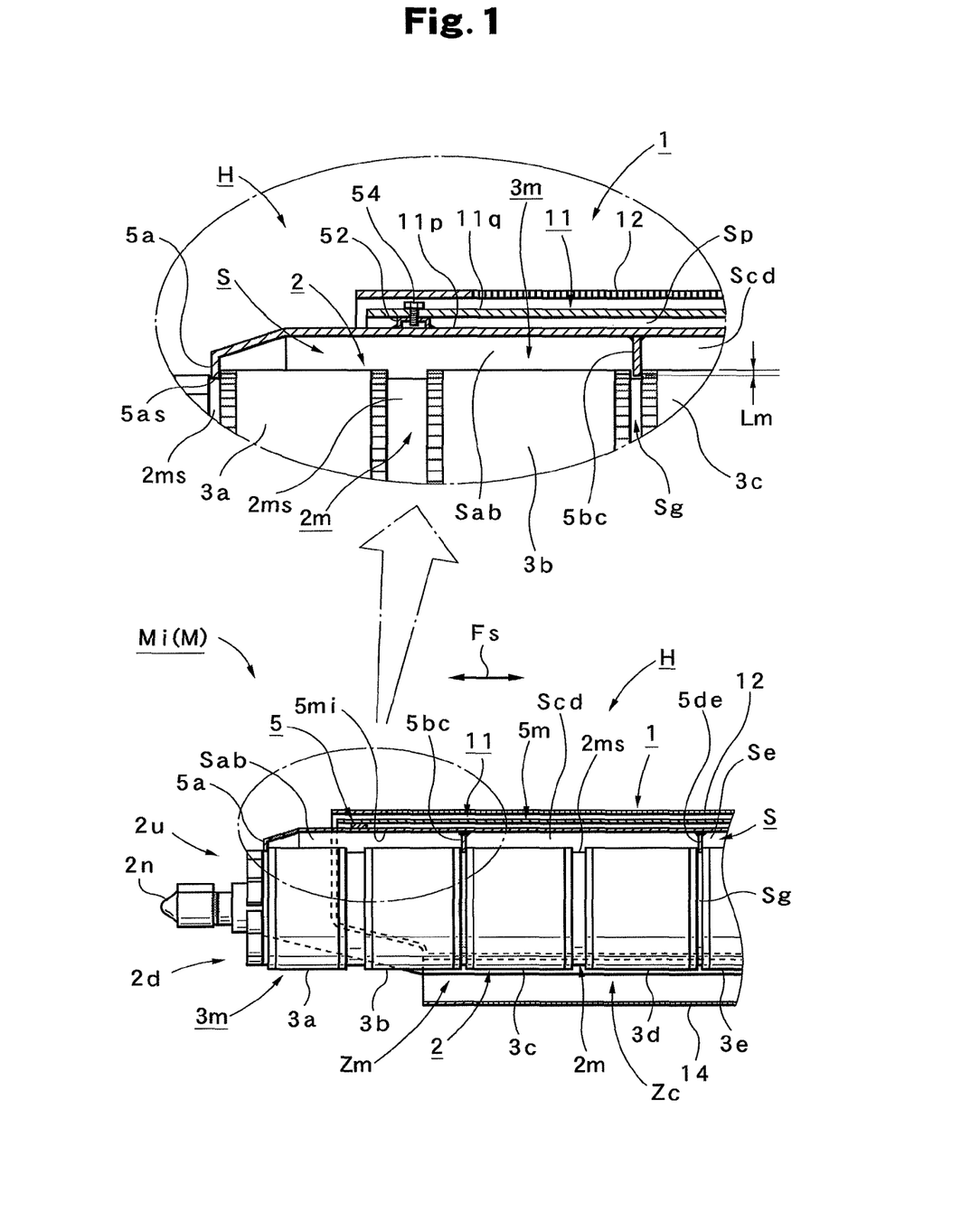
FIG. 1: A partial cross-sectional side view including a partially-extracted enlarged view of a heating cylinder device having a heating cylinder cover according to a preferred embodiment of this invention.

Moreover, the other partition parts 5bc, 5de, and 5ef lie in gaps Sg . . . generated between the heating units 3a, 3b, 3c, . . . in the axial direction Fs as shown in FIGS. 1 and 3. In this case, the heating units 3a . . . including the cooling units 4a . . . are provided corresponding to the heating areas in the heating cylinder body 2m, i.e., the front heating area Zf, the middle heating area Zm, the rear-front-side heating area Zrf, and the rear-back-side heating area Zrr, respectively; therefore, generally, as shown in FIG. 1, the gaps Sg . . . are generated between the heating units 3a . . . in the axial direction Fs, and the depth of the gaps Sg . . . , i.e., the depth between the outer circumferential surface 2ms of the heating cylinder body 2m and the outer circumferential surfaces of the heating units 3a . . . is Lm. Accordingly, for example, the partition part 5bc can lie in the gap Sg between the heating units 3b and 3c as shown in FIG. 1. The same goes for the other partition parts 5de and 5ef; the partition part 5de can lie in the gap Sg between the heating units 3d and 3e as shown in FIG. 1, and the partition part 5ef can lie in the gap Sg between the heating units 3e and 3f as shown in FIG. 4. At this time, the inner end sides of the partition parts 5bc, 5de, and 5ef can be set in direct contact with (be locked in) the outer circumferential surface 2ms of the heating cylinder body 2m, or can be in a state of being separated (suspended) as shown in FIG. 1.

By attaching the inner plate member 11p in this way, the partition parts 5a, 5bc, . . . are overlapped with the heating units 3a, 3b, . . . in a radial direction Fd, and the blockage of the closed spaces Sab, Scd, . . . formed by the partition parts 5a, 5bc, . . . can be further enhanced; therefore, it has the advantage of being able to contribute to the further improvement in the control responsiveness and the controllability and also being able to contribute to the improvement in the ease of attachment and the attachment strength.

On the other hand, on an outer surface of the inner plate member 11p, a pair of front and back separator members 52 and 53 for forming the gap Sp between the inner plate member 11p and the outer plate member 11q are fixed. In this case, the front-side separator member 52 is the outer surface of the inner plate member 11p and is located between the heating units 3a and 3b in the axial direction Fs, and the back-side separator member 53 is the outer surface of the inner plate member 11p and is located between the heating units 3f and the flange part 2mf in the axial direction Fs. It is preferable that the separator members 52 and 53 are set along about the full width in a circumferential direction Ff.

Then, the inner surface of the outer plate member 11q formed into a roughly similar shape is put on the separator members 52 and 53 of this inner plate member 11p, and is fixed on the separator members 52 and 53 by fixing bolts 55 . . . or the like. The heat-retaining cover part 5 is configured as above.

Subsequently, the upper and lower protective cover parts 12 and 14 attached to the heat-retaining cover 5 are described.

As shown in FIGS. 2 and 5, the upper protective cover part 12 is formed to be set lateral to the heat-retaining cover part 5 and have a shape of covering the cover body part 5m, and porous surfaces 55 . . . are formed on part (or all) of the upper protective cover part 12. In the case of the example, the porous surfaces 55 . . . are provided on an upper surface including an inclined area in the upper protective cover part 12, thereby the sufficient ventilation property is ensured. In this case, the area of the cover body part 5m covered by the upper protective cover part 12 can be part of the cover body part 5m, or can be the whole area of the cover body part 5m, and the area can be arbitrarily selected in consideration of the safety, etc. By providing such an upper protective cover part 12, protection for an operator from a high-temperature part can be achieved; therefore, it has the advantage of being able to further enhance the safety and also being able to contribute to the stabilization of the heat-retaining property and the further improvement in the heat-retaining property.

Furthermore, on the attachment of the upper protective cover part 12, attachment parts 13f . . . and 13r . . . for attachment to the heating cylinder 2 side are provided on the both right and left sides thereof in the radial direction Fd of the heating cylinder 2, respectively. In this case, the attachment parts 13f . . . are provided on, out of the both right and left sides of the inner plate member 11p attached to the heating cylinder 2, the side on which an operation screen 100 is provided that is the heating cylinder 2 side, and the attachment parts 13r . . . are provided on the other side. As shown in FIG. 2, the attachment parts 13f . . . are configured to have a locking structure in which no projection part projecting outward is caused. That is, in the case of the example, slits 62s . . . for insertion are formed at front and back positions on the side surface of the inner plate member 11p, and a bent part almost orthogonally bent inward is formed at the lower end of the side surface of the upper protective cover part 12, and projection pieces 62p . . . inserted into the slits 62s . . . are integrally formed at the distal end of this bent part. The other attachment parts 13r . . . can adopt a general attachment structure using bolts and nuts 61 . . . shown in FIG. 2.

In this way, on the attachment of the upper protective cover part 12, the attachment parts 13f . . . and 13r . . . for attachment to the heating cylinder 2 side are provided on the both right and left sides of the heating cylinder 2 in the radial direction Fd, respectively, and the attachment parts 13f . . . provided on, out of the both right and left sides, at least the side on which the operation screen 100 is provided are configured to have the locking structure in which no projection part projecting outward is caused, thereby an unwanted projection part in the area where an operator works can be eliminated, and therefore, it has the advantage of being able to contribute to the improvement in the working property and the safety, and further the designability (the shapeability).

On the other hand, as shown in FIGS. 2 and 5, the lower protective cover part 14 is formed to have a shape of covering the lower half part 2d of the heating cylinder 2, and porous surfaces 56 . . . are formed on part (or all) of the lower protective cover part 14. In the case of the example, the porous surfaces 56 . . . are provided on a lower surface including an inclined area of the lower protective cover part 14, thereby the sufficient ventilation property is ensured. In this way, as a cover of the lower half part 2d of the heating cylinder 2, only the lower protective cover part 14 can answer the purpose. In this case, the area of the lower half part 2d of the heating cylinder 2 covered by the lower protective cover part 14 can be part of the lower half part 2d, or can be the whole area of the lower half part 2d, and the area can be arbitrarily selected in consideration of the safety, etc. Accordingly, protection for an operator from a lower-half high-temperature site can be achieved, and therefore, the safety can be further enhanced, and, particularly, the lower half part 2d of the heating cylinder 2 where high-temperature air is not circulated can eliminate the need for the heat-retaining function, and only the lower protective cover part 14 can answer the purpose, and therefore, it has the advantage of being able to contribute to the improvement in the low cost and the ease of assembly due to the reduction of components.

Furthermore, on the attachment of the lower protective cover part 14, basically, the lower protective cover part 14 can be attached in the same manner as the above-described upper protective cover part 12. That is, attachment parts 15f . . . and 15r . . . for attachment to the heating cylinder 2 side are provided on the both right and left sides thereof in the radial direction Fd of the heating cylinder 2, respectively. In this case, the attachment parts 15f . . . are provided on, out of the both right and left sides of the inner plate member 11p attached to the heating cylinder 2, the side on which the operation screen 100 is provided that is the heating cylinder 2 side, and the attachment parts 15r . . . are provided on the other side. As shown in FIG. 2, the attachment parts 15f . . . are configured to have a locking structure in which no projection part projecting outward is caused. In the case of the example, slits 66s . . . for insertion are formed at front and back positions on the side surface of the inner plate member 11p, and a bent part almost orthogonally bent inward is formed at the upper end of the side surface of the lower protective cover part 14, and projection pieces 66p . . . inserted into the slits 66s . . . are integrally formed at the distal end of this bent part. The other attachment parts 15r . . . can adopt a general attachment structure using bolts and nuts 65 . . . shown in FIG. 2.

In this way, on the attachment of the lower protective cover part 14, the attachment parts 15f . . . and 15r . . . for attachment to the heating cylinder 2 side are provided on the both right and left sides of the heating cylinder 2 in the radial direction Fd, respectively, and the attachment parts 15f . . . provided on, out of the both right and left sides, at least the side on which the operation screen 100 is provided are configured to have the locking structure in which no projection part projecting outward is caused, thereby an unwanted projection part in the area where an operator works can be eliminated, and therefore, it has the advantage of being able to contribute to the improvement in the working property and the safety, and further the designability (the shapeability).

Subsequently, the function (action) of the heating cylinder cover 1 according to this embodiment is described with reference to FIGS. 1 to 9.

In the case of the injection molding machine M, while the injection molding machine M is in operation to manufacture products, the heating areas Zf, Zm, Zrf, and Zrr in the heating cylinder body 2m of the heating cylinder device H are controlled to a set temperature by the heating units 3a . . . and the cooling units 4a . . . . That is, the heating temperatures of the heating areas Zf, Zm, Zrf, and Zrr are detected by the temperature sensors T . . . , and the molding machine controller 41 causes the power feed unit 42 and the air supply unit 43 to perform feedback control so that the detected heating temperatures are controlled to the set temperature. In this case, on the heating control, the band heaters B . . . of the heating units 3a . . . are subjected to electric conduction control by the power feed unit 42; on the cooling control, the ventilation volume of the cooling units 4a . . . is controlled by the air supply unit 43.

On the other hand, heat is dissipated to around the heating cylinder 2; however, the heat dissipation is obstructed (insulated) by the heat-retaining cover part 5 having the heat-insulating property. That is, the heat-retaining cover part 5 has a basic structure in which the cover body part 5m that is attached to the heating cylinder 2 thereby forming the predetermined covered space S between the cover body part 5m and the temperature control mechanism 3m and covers at least the upper half part 2u of the heating cylinder 2 is integral with a plurality of the partition parts 5a, 5bc, . . . that project from the inner surface 5mi of this cover body part 5m toward the temperature control mechanism 3m and divide the covered space S into a plurality of the closed spaces Sab, Scd, . . . ; therefore, it is possible to achieve the basic effects of being able to achieve the reduction in power consumption and the improvement in energy saving due to the improvement in the heat-retaining property.

In addition, the circulation (the movement) of air by the heating units 3a, 3b, . . . is obstructed and insulated by the partition parts 5a, 5bc, . . . ; therefore, the impact (the interference) of arbitrary closed spaces Sab, Scd, on (with) the other spaces Sab, Scd, . . . is largely reduced. As a result, the responsiveness to temperature control in each of the closed spaces Sab, Scd, . . . is enhanced, and the controllability on the temperature distribution (temperature gradient) in the axial direction Fs is also enhanced. Furthermore, the improvement in energy saving can be achieved by the further reduction in power consumption accordingly. Moreover, the closed spaces Sab, Scd, . . . are set in the different heating areas Zf, Zm, Zrf, and Zrr in the heating cylinder 2, respectively; therefore, the trackability (the controllability) on the set temperature set with respect to each of the heating areas Zf, Zm, . . . is also enhanced further.

Figure 7:
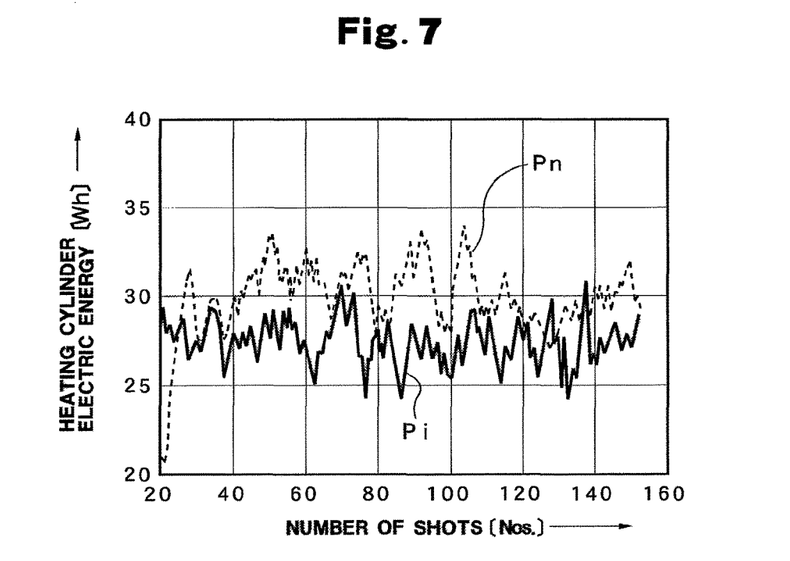
FIG. 7: A change characteristic diagram of heating cylinder electric energy according to the number of shots in molding using the heating cylinder device.
Figure 8:
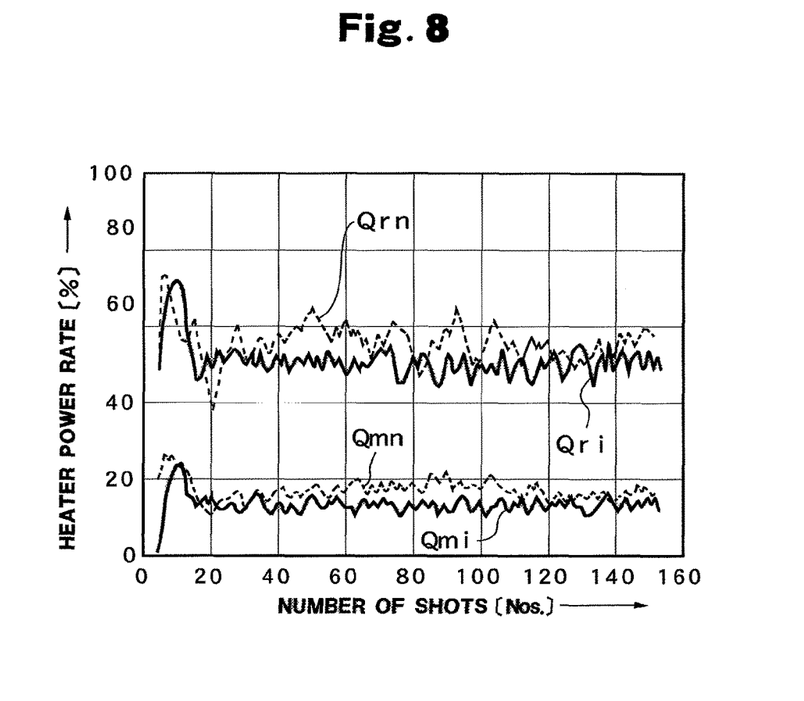
FIG. 8: A change characteristic diagram of heater power rate according to the number of shots in molding using the heating cylinder device.
Figure 9:
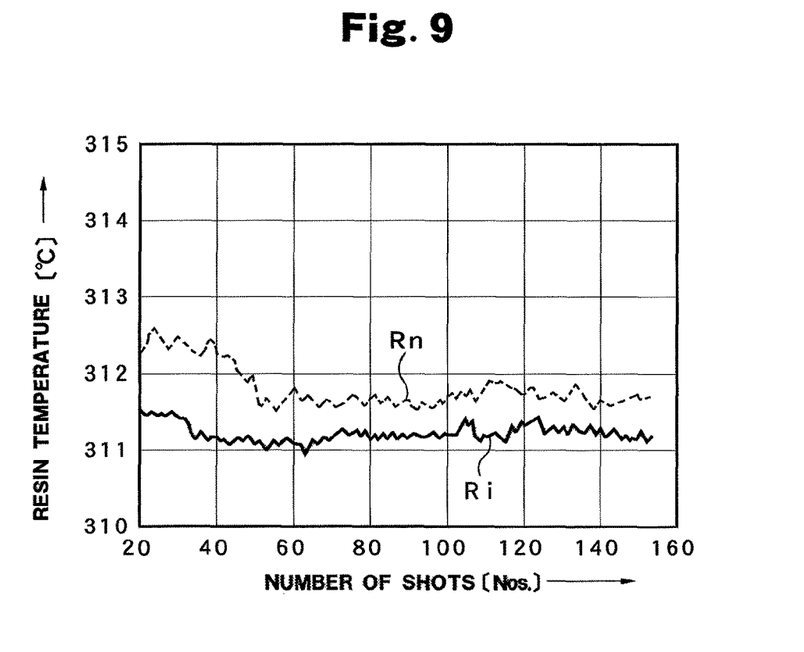
FIG. 9: A change characteristic diagram of resin temperature according to the number of shots in molding using the heating cylinder device.

FIGS. 7 to 9 show test results (data) indicating the impact on characteristics in the case of using the heating cylinder cover 1 according to this embodiment and the case of using a conventional heating cylinder cover (a cover with no partition parts 5a, . . . ).

FIG. 7 shows a change characteristic of electric energy [Wh] of the heating cylinder 2 according to the number of shots [Nos.], where Pi denotes a characteristic line in the case of using the heating cylinder cover 1 according to this embodiment, and Pn denotes a characteristic line in the case of using the conventional heating cylinder cover. It can be seen that by using the heating cylinder cover 1 according to this embodiment, power consumption is reduced and the energy saving is enhanced. The improvement rate (the reduction rate) of the conventional heating cylinder cover is roughly 2.3 [%].

FIG. 8 shows a change characteristic of heater power rate [%] of the heating cylinder 2 according to the number of shots [Nos.], where Qmi denotes a characteristic line of the middle heating area Zm in the heating cylinder 2 using the heating cylinder cover 1 according to this embodiment, Qmn denotes a characteristic line of the middle heating area Zm in the heating cylinder 2 using the conventional heating cylinder cover, Qri denotes a characteristic line of the rear-front-side heating area Zrf in the heating cylinder 2 using the heating cylinder cover 1 according to this embodiment, and Qrn denotes a characteristic line of the rear-front-side heating area Zrf in the heating cylinder 2 using he conventional heating cylinder cover. It can be seen that by using the heating cylinder cover 1 according to this embodiment, in both of the middle heating area Zm and the rear-front-side heating area Zrf, the heater power rate [%] is kept low, and the stability is ensured.

FIG. 9 shows a change characteristic of resin temperature [° C.] according to the number of shots [Nos.], where Ri denotes a characteristic line in the case of using the heating cylinder cover 1 according to this embodiment, and Rn denotes a characteristic line in the case of using the conventional heating cylinder cover. It can be seen that by using the heating cylinder cover 1 according to this embodiment, the stabilization of the resin temperature [° C.] is achieved.

The preferred embodiment is described in detail above; however, this invention is not limited to this embodiment, and a change, an addition, and a deletion can be arbitrarily made on the configurations, shapes, materials, numbers, numerical values, etc. of details without departing from the scope of the invention.

For example, in the embodiment, there is provided the case where the cover body part 5m is formed to have a shape of covering the upper half part 2u of the heating cylinder 2; however, it does not mean to eliminate a case where the lower half part 2d is included. Furthermore, there is provided the example where the covered space S is divided into four closed spaces Sab, Scd, . . . by the partition parts 5a, 5bc, . . . ; however, the number of the closed spaces Sab, Scd, . . . (the partition parts 5a, 5bc, . . . ) is optional. Moreover, there is provided the example where the heating units 3a . . . are combined with the cooling units 4a . . . ; however, only the heating units 3a . . . can be provided. At this time, the band heaters B . . . are provide as an example of the heating units 3a . . . , and the air-cooled type is provided as an example of the cooling units 4a . . . ; however, the heating units 3a . . . and the cooling units 4a . . . are not limited to these examples. Furthermore, there is provided the example where at least part of the distal ends of the partition parts 5a, 5bc, 5de, . . . lies in the gaps Sg . . . generated between the heating units 3a, 3b, 3c, . . . in the axial direction Fs; however, it does not mean to eliminate a case where the partition parts 5a, 5bc, 5de, . . . do not lie between the heating units 3a, 3b, 3c, . . . . Moreover, the lower protective cover part 12, and the lower protective cover part 14 are not a component essential for this invention.

INDUSTRIAL APPLICABILITY

The heating cylinder cover and the heating cylinder device according to this invention can be used in various types of injection molding machines including a heating cylinder provided with at least a plurality of heating units on the outer circumferential surface of a heating cylinder body.

REFERENCE SIGNS LIST

1: heating cylinder cover, 2: heating cylinder, 2m: heating cylinder body, 2ms: outer circumferential surface of heating cylinder body, 2u: upper half part of heating cylinder, 2d: lower half part of heating cylinder, 3a: heating unit, 3b: heating unit, 3c . . . : heating unit, 3m: temperature control mechanism, 4a: cooling unit, 4b: cooling unit, 4c . . . : cooling unit, 5: heat-retaining cover part, 5a: partition part, 5bc: partition part, 5de: partition part, 5m: cover body part, 5mi: inner surface of cover body part, 11: multi-layer structure, 11p: plate member (inner plate member), 11q: plate member (outer plate member), 12: protective cover part (upper protective cover part), 13f: attachment part, 13r: attachment part, 14: lower protective cover part, 15f: attachment part, 15r: attachment part, 100: operation screen, M: injection molding machine, H: heating cylinder device, Fs: axial direction, Fd: radial direction, Ff: circumferential direction, B . . . : band heater, S: covered space, Sab: closed space, Scd . . . : closed space, Sp: gap, Sg: gap, Zf: front heating area, Zm: middle heating area, Zrf: rear-front-side heating area, Zrr: rear-back-side heating area

The invention claimed is:

1. A heating cylinder cover of an injection molding machine that covers a heating cylinder having a temperature control mechanism in which at least a plurality of heating units are provided on an outer circumferential surface of a heating cylinder body along an axial direction, the heating cylinder cover comprising:
a heat-retaining cover part that is integrally provided with a cover body part and a plurality of partition parts, the cover body part being attached to the heating cylinder thereby forming a predetermined covered space between the cover body part and the temperature control mechanism and covering at least an upper half part of the heating cylinder, the partition parts projecting from an inner surface of this cover body part toward the temperature control mechanism and dividing the covered space into a plurality of closed spaces;
wherein the partition parts are set in different heating areas in the heating cylinder body, respectively.

2. The heating cylinder cover of the injection molding machine according to claim 1, wherein the cover body part is configured to have a multi-layer structure in which a plurality of plate members are stacked on top of another through a predetermined gap.

3. The heating cylinder cover of the injection molding machine according to claim 1, wherein the cover body part is configured to have a single-layer structure using one plate member.

4. The heating cylinder cover of the injection molding machine according to claim 1, wherein the heating areas include a front heating area, a middle heating area, a rear-front-side heating area, and a rear-back-side heating area in order from a front side of the heating cylinder or combinations of these heating areas.

5. A heating cylinder device of an injection molding machine that includes a heating cylinder having a temperature control mechanism in which at least a plurality of heating units are provided on an outer circumferential surface of a heating cylinder body along an axial direction and a heating cylinder cover for covering this heating cylinder, the heating cylinder device comprising:
the heating cylinder cover including a heat-retaining cover part that is integrally provided with a cover body part and a plurality of partition parts, the cover body part being attached to the heating cylinder thereby forming a predetermined covered space between the cover body part and the temperature control mechanism and covering at least an upper half part of the heating cylinder, the partition parts projecting from an inner surface of this cover body part toward the temperature control mechanism and dividing the covered space into a plurality of closed spaces;
wherein the partition parts are set in different heating areas in the heating cylinder body, respectively.

6. The heating cylinder device of the injection molding machine according to claim 5, wherein at least part of distal ends of the partition parts lies in the gaps generated between the heating units in the axial direction.

7. The heating cylinder device of the injection molding machine according to claim 5, wherein the closed spaces are set in different heating areas in the heating cylinder body, respectively.

8. The heating cylinder device of the injection molding machine according to claim 7, wherein the heating areas include a front heating area, a middle heating area, a rear-front-side heating area, and a rear-back-side heating area in order from a front side of the heating cylinder or combinations of these heating areas.

9. The heating cylinder device of the injection molding machine according to claim 5, wherein the temperature control mechanism includes the heating units each using a band heater provided along the axial direction of the outer circumferential surface.

10. The heating cylinder device of the injection molding machine according to claim 9, wherein the temperature control mechanism includes an air-cooled type cooling unit composed of an air passageway provided between the outer circumferential surface and the band heaters.

11. The heating cylinder device of the injection molding machine according to claim 10, wherein the air passageway is composed of a pattern formed by making a slit in a plate member lying between the outer circumferential surface of the heating cylinder body and the band heaters.

12. The heating cylinder device of the injection molding machine according to claim 5, wherein the heating cylinder cover includes a protective cover part with a porous surface formed on at least part thereof, the porous surface being provided lateral to the cover body part to cover part or all of the cover body part.

13. The heating cylinder device of the injection molding machine according to claim 12, wherein the protective cover part includes attachment parts for attachment to the heating cylinder side on both right and left sides thereof in a radial direction of the heating cylinder, and at least the attachment part on the side on which an operation screen is provided out of the both right and left sides is configured to have a locking structure in which no projection part projecting outward is caused.

14. The heating cylinder device of the injection molding machine according to claim 5, wherein the cover body part is formed to have a shape of covering the upper half part of the heating cylinder, and the heating cylinder cover includes a lower protective cover part that has a porous surface formed on at least part thereof and covers a lower half part of the heating cylinder.

15. The heating cylinder device of the injection molding machine according to claim 14, wherein the lower protective cover part includes attachment parts for attachment to the heating cylinder side on both right and left sides thereof in a radial direction of the heating cylinder, and at least the attachment part on the side on which an operation screen is provided out of the both right and left sides is configured to have a locking structure in which no projection part projecting outward is caused.

* * * * *